United States Patent [19]

Cunning

[11] Patent Number: 4,700,892
[45] Date of Patent: Oct. 20, 1987

[54] MISTING AND WATERING CAN

[75] Inventor: Joseph M. Cunning, Cohasset, Mass.

[73] Assignee: Blue Mountain Products, Inc., Utica, N.Y.

[21] Appl. No.: 917,516

[22] Filed: Oct. 10, 1986

[51] Int. Cl.$^4$ ................... A01G 25/14; B05B 15/00; B05B 9/03

[52] U.S. Cl. ................... 239/289; 239/332; 239/377; 239/378; 239/443; 239/487; 222/192; 222/324; 222/464

[58] Field of Search ............... 239/289, 329, 331–333, 239/345, 349, 375–378, 436, 443, 472, 475, 487; 222/192, 324, 464, 465.1

[56] References Cited

U.S. PATENT DOCUMENTS

| 178,096 | 5/1876 | Ballou et al. | 239/375 X |
|---|---|---|---|
| 583,482 | 6/1897 | Kagey | 239/375 X |
| 689,208 | 12/1901 | Masterson | 239/331 X |
| 2,723,056 | 11/1955 | Smith | 222/464 X |
| 3,648,933 | 3/1972 | Grotz | 239/377 |
| 4,030,664 | 6/1977 | Tisbo et al. | 239/333 X |

FOREIGN PATENT DOCUMENTS 2082444  3/1982  United Kingdom ............... 239/377

Primary Examiner—Andres Kashnikow
Assistant Examiner—Mary Beth O. Jones
Attorney, Agent, or Firm—Anthony A. O'Brien

[57] ABSTRACT

A misting and watering can includes a can body having a pouring spout on one side thereof and a hollow handle on its opposite side. A misting and watering nozzle mounted in the pouring spout includes a misting aperture surrounded by multiple pouring passages in communication with the pouring spout. A pumping mechanism within the hollow handle includes a trigger operator. A delivery tube in the interior of the can body is connected with the pumping mechanism within the hollow handle. A discharge tube connected with the pumping mechanism extends within the pouring spout and is connected with the nozzle in communication with the misting aperture.

9 Claims, 5 Drawing Figures

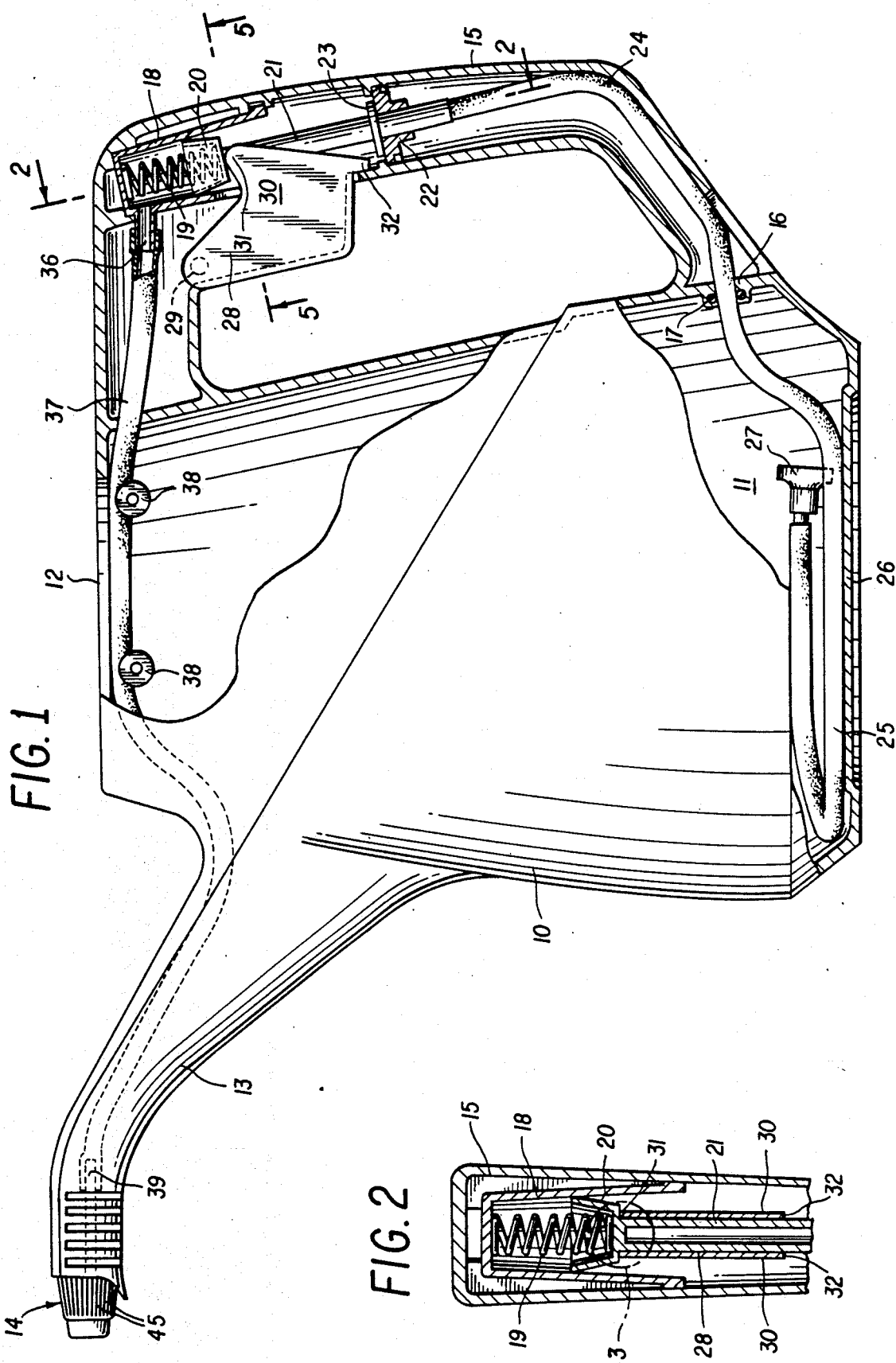

MISTING AND WATERING CAN

BACKGROUND OF THE INVENTION

1. Technical Field

The present invention relates to a misting and watering can and more particularly to a can having a dispensing spout through which a mist of water under positive pressure may be discharged or through which water may be poured merely by tilting the can.

2. The Prior Art

U.S. Pat. No. 4,030,664 discloses a spraying and watering can having a pouring spout for a stream of water and a separately mounted sprayer unit on the top of the can sharing a common reservoir with the pouring spout.

U.S. Pat. No. 3,648,933 discloses a watering can having separately mounted pouring and rosette spouts at opposite sides of the can in association with a circular handle common to both. Both of these prior art arrangements are somewhat cumbersome and inconvenient to use and it is the objective of this invention to improve on the known prior art through provision of a highly convenient watering can by means of which a mist of water or a poured water stream may be delivered through a common spout on one side of the can, the can being equipped on its opposite side with a handle having a contained pumping means operable to deliver a mist through a nozzle on the spout of the can, said nozzle being constructed to also deliver a poured water stream in cases where a mist is not desired.

Another object of the invention is to provide a misting and watering can of the mentioned character where substantially all operating components are held inside of the can structure in a concealed manner.

Other objects and advantages of the invention will become apparent to those skilled in the art during the course of the following description.

SUMMARY OF THE INVENTION

The present invention is best summarized as a misting and watering can having a single dispensing spout and manipulating handle. The spout is equipped with a nozzle through which water can be poured onto a plant or the like or through which a pressurized water mist can be delivered. A mist pump mechanism contained in the handle of the can includes a convenient trigger for operating the pump to deliver water from the reservoir through a tube extending through the spout within which the tube is coupled to a spinner device of the nozzle communicating with a mist aperture thereof. The nozzle also has external grooves within the spout through which water is poured directly from the spout when the can is properly tilted. A filtered water delivery tube within the can reservoir is connected with the pump mechanism within the handle and is sufficiently long to be extended through a top filling opening of the can to clean the filter thereof.

BRIEF DESCRIPTION OF THE DRAWINGS

FIG. 1 is a side elevation, partly in vertical cross section, of a misting and watering can according to the invention.

FIG. 2 is a fragmentary section taken on line 2—2 of FIG. 1.

DETAILED DESCRIPTION

Figure 3:
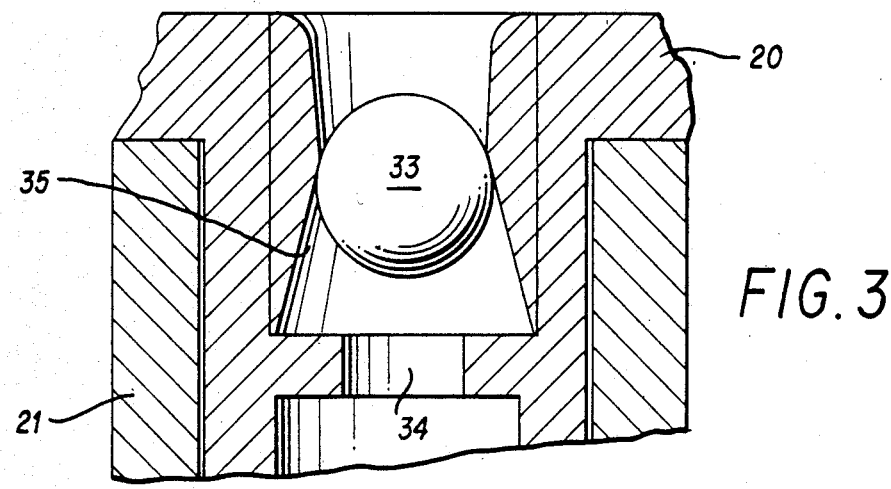
FIG. 3 is an enlarged cross-sectional detail of the circled area 3 in FIG. 2 showing a trapped ball valve.
Figure 4:
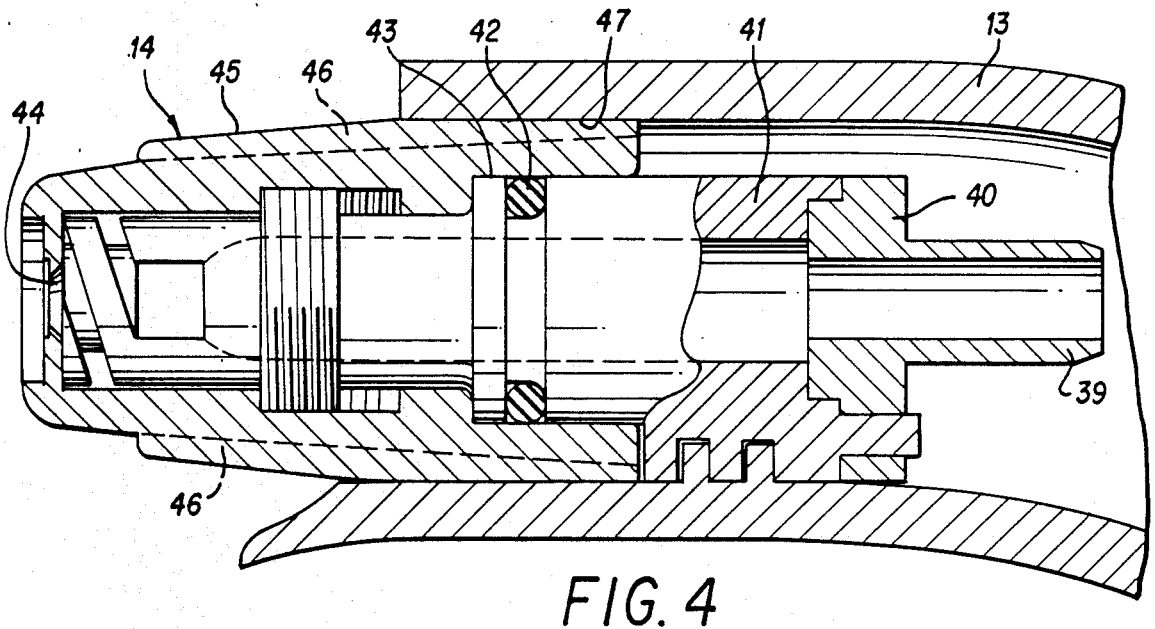
FIG. 4 is an enlarged fragmentary vertical cross-section taken through the forward portion of the can pouring spout and the nozzle and spinner contained therein.

Referring to the drawings in detail wherein like numerals designate like parts, a can body 10 contains a water reservoir 11 which is filled with water through a top filling opening 12 of the can body. A spout 13 on one side of the can body 10 near its top contains a nozzle 14, to be fully described, from which either a water mist or stream of water may be delivered. A hollow handle 15 on the opposite side of the can body 10 is separated from the reservoir 11 by a side wall portion 16 of the can body containing an O-ring seal 17.

Within the top portion of the handle 15 and suitably fixed therein is a pump casing 18 within which is held a compression spring 19 bearing on a cup 20 at its lower end. The cup 20 is attached to a pump piston 21 within the hollow handle and the pump piston engages through a piston guide 22 suitably fixed inside of the handle, as shown in FIG. 1. The piston 21 has an attached stop collar 23 which engages the upper end face of the guide 22 to limit downward travel of the piston 21 under influence of the spring 19.

At its lower end, the pump piston 21 is connected to a flexible PVC tube 24 within the handle 15, this tube extending through the O-ring seal 17 and being sealed thereby and terminating in a long loop portion 25 lying on the bottom wall 26 of the can body. The flexible water delivery tube portion 25 is equipped at its end with a suction filter 27. The loop portion 25 is sufficiently long to permit the suction filter 27 periodically to be extended through the top filling opening 12 of the can for cleaning of the filter.

Figure 5:
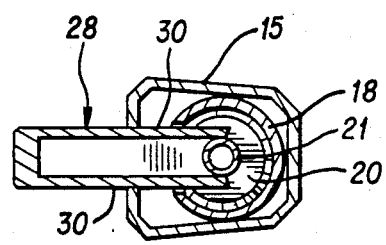
FIG. 5 is a fragmentary section taken on line 5—5 of FIG. 1.

A trigger 28 is pivotally attached at its top through a pivot element 29 with the upper portion of the handle 15. Both the handle 15 and pump casing 18 are slotted, FIG. 5, to allow the trigger 28 to pivot or swing freely therein when engaged by a finger of the hand grasping the handle 15. The trigger includes spaced side walls 30 which straddle the pump piston 21 and a cam lobe 31 which engages the bottom wall of the cup 20 to force the same upwardly and compress the spring 19 when the trigger is pulled rearwardly. When the trigger is released, the spring 19 automatically returns the trigger and the pump piston 21 to their normal positions shown in FIG. 1. The stop collar 23 of the piston is then engaged with the fixed guide 22 and stop extensions 32 on the lower end of the trigger 28 are solidly engaged with the forward wall of the handle 15.

Referring to FIGS. 2 and 3, the pump piston 21 at its upper end where it is joined to the cup 20 is equipped with a trapped ball valve element 33 which cyclically can close an aperture 34 in the piston and engage a tapered seat 35 above this aperture. During pumping to produce a mist or spray at the nozzle 14, the piston 21 reciprocates under influence of the trigger 28 and spring 19 and on each reciprocation the ball valve causes water from the reservoir 11 to be drawn through the filter 27 and flexible tube 24 and through the pumping ball valve into the pump casing 18.

The pump casing 18 is connected by a forward side nipple 36, FIG. 1, to another flexible tube 37 which extends generally horizontally across the top of the can body 10 near one side wall thereof. The tube 37 passes over two support elements 38 inside of the can body and near one side of the filling opening 12.

The flexible tube 37 extends forwardly through the spout 13 and is coupled therein with a rear nipple 39 of a spinner cover 40 in the forward extremity of the spout 13. The spinner cover 40 is coupled with a spinner 41 immediately forwardly thereof and the spinner at its forward end carries an O-ring seal 42 sealingly engaged with a rear bore portion 43 of the nozzle 14.

At its forward tip, the nozzle 14 has a mist aperture 44 through which a water mist created by pumping with the trigger 28 and after being acted on by the spinner 41 is discharged onto a plant or the like.

The nozzle 14 has a multiplicity of circumferentially spaced longitudinal teeth 45 forming between them a corresponding number of passages 46 for water being poured from the reservoir 11 through the pouring spout 13. The toothed surface of the nozzle 14 is fixedly engaged in the forward bore portion 47 of the pouring spout 13 and the multiple grooves 46 are all in communication with the interior of the spout 13 so that water can be poured through the grooves 46 merely by tilting the spout 13 in the customary manner.

Thus, it may be seen, that a user of the can may selectively pour water or discharge a fine mist from the nozzle 14 by utilizing the pumping trigger 28. Since the mist and poured water capabilities are combined in a single nozzle 14 on a single spout 13 controlled by one hand of the user gripping a single handle 15 and utilizing the trigger 28, when necessary, the device is much more convenient to use than the known prior art devices discussed previously.

Inasmuch as the present invention is subject to many modifications, variations, and changes in detail, it is intended that all of the material in the aforegoing specification or in the accompanying drawings be interpreted as illustrative, and not in a limiting sense.

I claim:

1. A misting and watering can comprising
a can body having a pouring spout,
a nozzle mounted in the pouring spout and having a mist discharge aperture and pouring passages surrounding said aperture and being in communication with the interior of the pouring spout, and
manual pumping means on the can body operable to deliver water from the interior of the can body to said mist discharge aperture, water from the interior of the can body being delivered to said pouring passages of the nozzle through said spout by tilting the can body.

2. A misting and watering can as defined in claim 1, and the pumping means including a spinner connected with the nozzle within said spout and communicating with said mist discharge aperture.

3. A misting and watering can as defined in claim 1, and the pouring spout being located on one side of the can body, a handle for the can body on the hand body in spaced relationship to the spout, and the pumping means including a piston pump mechanism disposed within the handle and including an actuating trigger pivoted on the handle and being accessible to a finger of a hand gripping the handle.

4. A misting and watering can as defined in claim 3, and a flexible water delivery tube connected with the piston pump mechanism within said handle and extending from the handle into the interior of said can body and having a filtered inlet element within the can body, and another tube connected with the piston pump mechanism and extending into the pouring spout and being connected with said nozzle in communication with the discharge aperture thereof.

5. A misting and watering can as defined in claim 3, and said piston pump mechanism further including a reciprocatory piston, a linear guide for said piston within said handle, a pump casing within said handle in communication with said piston, a return spring for said piston within said pump casing, said trigger having a cam lobe engaging said piston, and a pumping valve means on said piston operable during reciprocation of the piston to deliver water into said pump casing, said pump casing being in communication with said mist discharge aperture of said nozzle.

6. A misting and watering can comprising
a can body having a filling opening,
a pouring spout on one side of the can body,
a hollow handle for the can body substantially on the opposite side thereof,
a combined misting and watering nozzle held within said spout and having a central misting aperture and a multiplicity of exterior pouring passages surrounding the misting aperture and communicating with the interior of the pouring spout,
a water pumping mechanism within the hollow handle including a movable operating element for the pumping mechanism projecting outside of the hollow handle,
a delivery tube connected with the pumping mechanism within the hollow handle and extending therefrom into the interior of said can body near the bottom of the can body, and
a discharge tube connected with the pumping mechanism within the hollow handle and extending therefrom near the top of the can body into said pouring spout and being connected therein with said misting and watering nozzle in communication with said central misting aperture of the nozzle.

7. A misting and watering can as defined in claim 6, and said nozzle including a spinner rearwardly of and in communication with said misting aperture and being connected with said discharge tube.

8. A misting and watering can as defined in claim 6, and said water pumping mechanism including a reciprocating mechanism having a pumping valve.

9. A misting and watering can as defined in claim 8, and said valve comprising a captive ball valve having a water inlet aperture adapted to be cyclically closed and opened and an opposing tapered chamber defining a seat for the captive ball of said valve.

* * * * *